United States Patent [19]

Wilson

[11] Patent Number: 4,995,693
[45] Date of Patent: Feb. 26, 1991

[54] MULTI-POSITION OPTO-ELECTRONIC SWITCH

[75] Inventor: Mark L. Wilson, Vadnis Heights, Minn.

[73] Assignee: Unisys Corporation, Blue Bell, Pa.

[21] Appl. No.: 228,617

[22] Filed: Aug. 5, 1988

[51] Int. Cl.$^5$ .............................................. G02B 6/32
[52] U.S. Cl. .............................. 350/96.18; 350/96.13
[58] Field of Search ........................... 350/96.13, 96.18

[56] References Cited

U.S. PATENT DOCUMENTS 4,530,573 7/1985 Wolkstein ..................... 350/96.13
4,693,548 9/1987 Tsunoi ........................... 350/96.18

Primary Examiner—William L. Sikes
Assistant Examiner—Robert E. Wise
Attorney, Agent, or Firm—Arnold L. Albin; Glenn W. Bowen; Robert S. Bramson

[57] ABSTRACT

An optical switch for coupling one of a plurality of input light sources to one of a plurality of output terminals is comprised of a Bragg cell array acoustically excited in accordance with one or more preselected control frequencies from a selectable source of such frequencies. The beam deflection is proportional to the applied radio frequency. A scan lens is positioned to intercept the deflected beams and to focus the beams into a plane for imaging upon a linear array of optical output fibers. By choice of the control frequency any combination of input and output fiber optic lines may be optically coupled without requiring active sensors. Sufficient diffraction is provided by the Bragg cell in combination with the scan lens to minimize cross-talk and insertion loss.

8 Claims, 3 Drawing Sheets

MULTI-POSITION OPTO-ELECTRONIC SWITCH

BACKGROUND OF THE INVENTION

1. Field of the Invention

The invention relates to switching of optical signals and more particularly to an acousto-optic matrix switch for coupling between a plurality of fiber optic cables.

2. Description of the Prior Art

Optical fibers are widely used for communications because of their extremely wide information bandwidth and immunity to ground loops and electromagnetic interference. Many commercial and military applications utilize optical fibers for interconnections between high speed digital devices or to connect between sensors and signal processing systems. Many such fiber optic data communication systems require a dynamically reconfigurable data network. Optical switches are essential in order to construct such data networks with wide bandwidth and high reliability. The conventional structure for accomplishing this task involves mechanical switches or non-mechanical switches using optical waveguides wherein the optical signals are routed through a crystal and switched using an electro-optic effect. Mechanical switches are limited in speed of operation and bandwidth. The optical waveguide switches suffer from material instabilities and temperature sensitivity. Further, the structures heretofore employed have required a plurality of switching elements, typically $n^2$ elements for an $n \times n$ matrix, operated in a blocking mode, thereby resulting in excessive insertion loss and cross-talk.

Multi-position signal switches utilizing acousto-optic elements are known in the prior art. For example, U.S. Pat. No. 4,530,573 describes a system in which a Bragg cell is acoustically modulated in accordance with one or more preselected control frequencies. A light beam is deflected by an amount dependent on the acoustically modulated frequency. A plurality of photodetectors are positioned to intercept the deflected beam at its respective possible deflection angles and to convert the optical signals so received into electrical output signals. Thus, by the choice of control frequency, a signal corresponding to the input signal can be caused to appear at the output of one or more photodiodes.

The aforesaid invention discloses a Bragg cell comprised of lithium niobate. A relatively low figure of merit of this material requires that active detector elements be utilized in order to distinguish sufficiently from the noise background. Further, an array of such detector elements is subject to cross-coupling and resultant cross-talk in the switch outputs.

Another type of switch is described in the article "Path-Independent Insertion Loss Optical Space Switch", T. Shimoe, et al, Technical Digest, Sixth International Conference on Integrated Optics and Optical Fiber Communication, 19-22, Jan. 1987. Shimoe describes an $n \times n$ matrix switch comprised of $n^2$ switch elements. In the prior art described therein, since the number of switch elements through which optical signals pass are path-dependent, both insertion loss and signal-to-cross-talk ratio are degraded. An improved switch described in the article provides a constant number of switch elements for any selected switch path, but requires a plurality of such elements resulting in excessive insertion losses. Further, this article does not disclose the use of acousto-optic switch elements.

The present invention provides an acousto-optic switch which requires no active optical waveguide devices to detect, switch, or regenerate an optical signal. It provides low fiber-to-fiber insertion loss, low cross-talk, high efficiency, and wide bandwidth. The components have a mature technology base and are commercially available.

SUMMARY OF THE INVENTION

The present invention provides an acousto-optic switch for selectively coupling an optical signal from one of a plurality of input terminals to one of a plurality of output terminals. Light beam signals appearing at the input terminals are collimated and configured in a linear array with a predetermined spacing between light beam elements. A multi-channel Bragg cell, also arranged in a linear array, is positioned in the path of the light beams so that each one of the light beams is incident upon a given one acousto-optic element at an acousto-optical angle. An RF control signal provides a selected one of a plurality of preselected frequencies which is applied to the acousto-optic elements for producing acoustic waves in accordance with the control signal and thereby provides a deflection of at least one of the collimated light beams in passing through one of the acousto-optic elements. The angle of deflection is a function of the frequency of the RF control signal. A lens is positioned to intercept the deflected light beam and focusses the collimated beam, in accordance with its angle to the lens axis, to a focal point in the focal plane of the lens, which is orthogonal to the plane of the Bragg cell, thereby providing an essentially linear displacement of the light beam images in accordance with the angular deflection imposed by the RF control signal. A plurality of output terminals are positioned to receive the light beam images so that a deflected light beam is incident upon one of a plurality of output terminals in accordance with the frequency of the RF control signal.

DESCRIPTION OF THE PREFERRED EMBODIMENT

Figure 1:
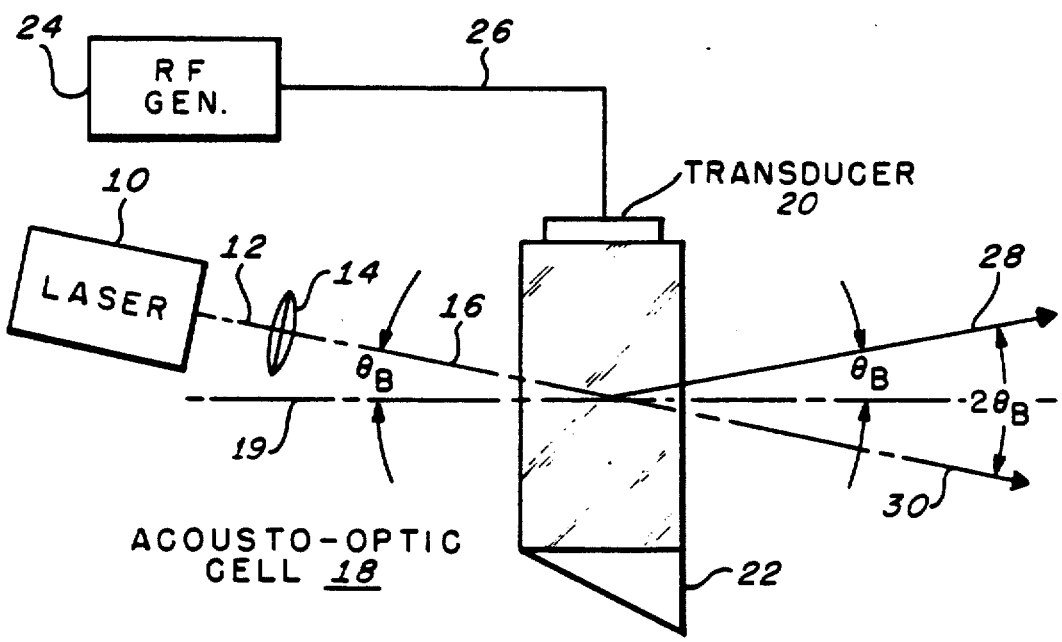
FIG. 1 is exemplary of the operation of an acousto-optic diffraction element.

Referring to FIG. 1, an acousto-optic apparatus is seen to include a light source 10, which may comprise a laser or some other light source, for providing a beam of light 12 which is collimated by a lens 14 to produce a collimated beam of light 16. The light beam 16 is incident upon an acousto-optic cell 18 at an angle $\theta_B$ with respect to a normal 20 to the acousto-optic cell 18. One end of the cell 18 is energized by a transducer 20 and an acousto-absorber 22 is affixed to an opposing end. The apparatus includes a radio frequency signal source 24 coupled via a cable 26 to the transducer 20. When transducer 20 is excited by the RF source 24, it results in a diffraction of the light beam 16 in passing through acousto-optic cell 18 to produce a first order output beam 28 at an angle $\theta_B$ with respect to the normal 20. An undeflected zero order beam 30, which is at a sustantially lower magnitude than that of the light beam 28, may be absorbed by a light stop, not shown.

The acousto-optic cell generally consists of a transparent optical medium to which a transducer plate is bonded for propagating acoustic waves generated by the transducer. The transducer is typically a thin plate of piezoelectric crystal such as quartz ($SiO_2$) or lithium niobate ($LiNbO_3$). The optical medium is of an anisotropic crystalline structure and possesses appropriate symmetry properties. There are several materials which have acousto-optic properties and which are commonly utilized to form such acousto-optic cells, including glass, lithium niobate, gallium phosphide, and telurium dioxide ($TeO2$). A preferred material for the optical medium is telurium dioxide. Telurium dioxide has a relatively low acoustic velocity (617 m/s) compared to quartz (5960 m/s).

When a radio frequency signal is applied to the piezoelectric transducer, the transducer will vibrate at the frequency of the applied RF signal. The vibrations of the transducer cause a travelling compressional wave to propagate through the block of acousto-optic material to which it is bonded. The local stress caused by the travelling compressional wave creates slight local density variations within the acousto-optic material. The density of the material and its index of refraction are directly related, so that the compressional wave establishes a volume phase grating in the region where the compressional energy is propagating. It is known that a volume phase grating will deflect light which enters the grating region at the correct angle. This angle is known as the Bragg angle, and is defined as follows:

$$\sin \theta_B = \lambda Fm/V_S \qquad (1)$$

where
$\lambda$ = wavelength of the incident light beam
Fm = frequency of RF signal applied to the cell
$V_S$ = velocity of sound in the cell.

The light beam 16 incident at the Bragg angle $\theta_B$ will be deflected into a new direction 28. Within certain limits, the deflected light beam can be bent over a range of angles by varying the RF frequency.

Operation at the highest efficiency requires that the light beam to be switched be incident to the acoustic wave at the Bragg angle. Since the incident light angle must therefore vary with the optical wavelength and applied radio frequency, a large angular acceptance aperture is desirable. In general, the deflection efficiency depends upon many parameters. These parameters include the wavelength of the light to be deflected, the magnitude of the RF power coupled into the cell, the interaction length between the acoustic field and the light, and most importantly, the acousto-optic material parameters. The parameter most often used to characterize the acousto-optic capabilities of a Bragg cell is the acousto-optic figure of merit (M). The acousto-optic figure of merit for telurium dioxide is 525, compared to 1 for quartz. It may be seen that this results in a greater angular dispersion for a given change in the applied radio frequency, therefore providing a more compact switch assembly. Various Bragg cells are commercially available and may be utilized.

Figure 2:
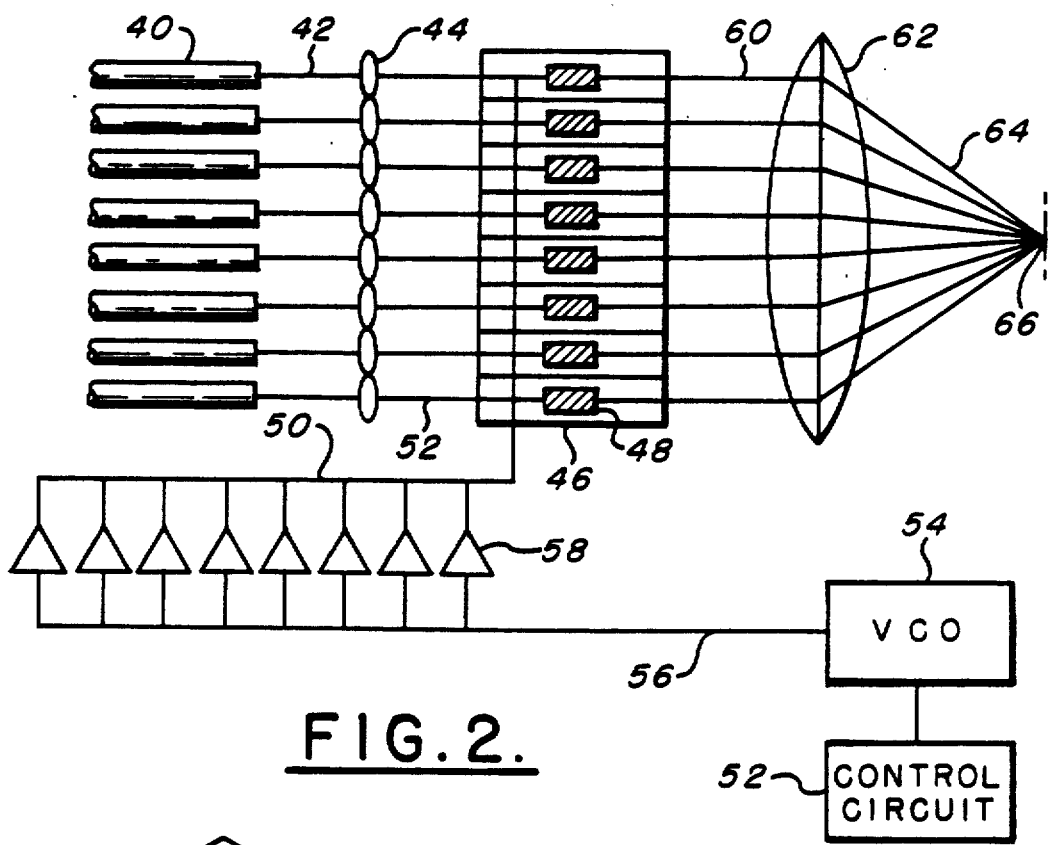
FIG. 2 shows in plan view an array of acousto-optic elements in accordance with a preferred embodiment of the present invention.

Referring now to FIG. 2 with continued reference to FIG. 1, a preferred embodiment of the invention is shown. It may be seen from FIG. 1 that as the frequency of the RF signal is varied, the angle between the optical axis 20 and the output beam 28 will vary in accordance with equation (1). By varying the RF signal, the output beam may be caused to be incident upon anyone of several fibers and connected with the original input optical signal. FIG. 2 shows a plurality of optical fibers 40 arranged in a linear array so that the output light beam 42 of each is incident upon a lens 44. A plurality of lenses 44 is used to focus each of the light beams upon a corresponding array of acousto-optic cells 46. Each cell 46 has an associated transducer 48 which is driven by a radio frequency signal on line 50. The beam 52 exiting from a fiber optic cable is typically of the order of 60 $\mu$ in diameter and may be expanded to a beam diameter of approximately 1-2 mm by the positioning of the collimating lens 44. The collimated beam 52 is incident upon a corresponding acousto-optic element 46. A multi-aperture Bragg cell as in FIG. 2 is commercially available from Newport Electro-Optics Systems, Melbourne, Fla. 32935 as Part No. N45070-2.8-8 in a package approximately 36 mm long by 8 mm wide and 7 mm deep. Typically, the cells are spaced by 4.43 mm. Each aperture of the multi-aperture array individually deflects an optical signal 52 incident upon it through a deflection angle shown most clearly in FIG. 3, which corresponds to FIG. 1. Each transducer element 48 is selectively addressed at a predetermined radio frequency so that the deflection angles are selectively controllable. A discrete stepping frequency source, such as a frequency synthesizer may be used for the signal source 24. Alternatively, any RF generator, which is a conventional device well understood in the art, may be used to produce an electrical signal having a fixed frequency at a predetermined amplitude. In the circuit of FIG. 2, the control circuit 52 may comprise a digital computer programmed to provide a digital output in accordance with a desired angular deviation. The digital output is applied to a voltage controlled oscillator 54, which accepts the digital command and provides an analog output corresponding to a desired radio frequency on line 56. If required, suitable buffer amplifiers 58 may be provided to drive each of the transducer elements.

Figure 3:
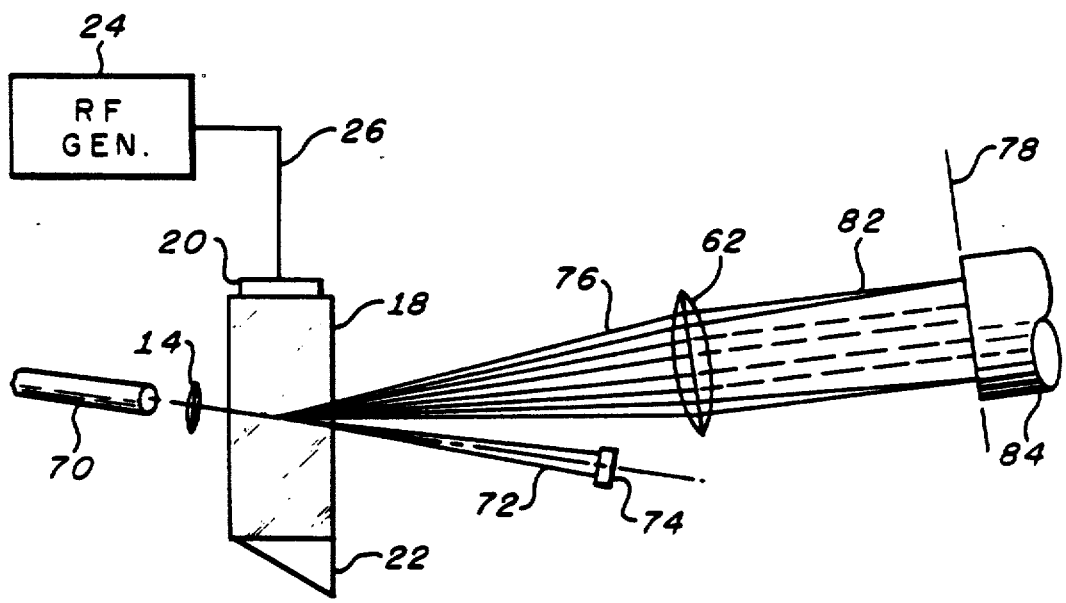
FIG. 3 shows the invention of FIG. 2 in a side view.

The light beam outputs of the acousto-optic array 46 are transmitted in parallel planes 60 perpendicular to the plane of array 46, to a lens 62. Lens 62 is of the type known as a scan lens which has the property of focussing the collimated light beams in the planes 60 to an image line 66. Image line 66 represents the locus of focal points in a plane 78 normal to an optical axis of the lens 62, as is shown more clearly in FIG. 3. FIG. 3 represents an end view of the array 46 in which the acoustooptic cell 18 is shown in section having a radio frequency signal applied by a generator 24 to the transducer 20. A light beam from an input fiber 70 is collimated by lens 14 to provide a zero order ray 72 which is absorbed by a lens stop 74 and a first order deflected ray 76 which is incident upon lens 62. It may be seen that the deflected beam 76 can be varied over an angular range in accordance with the applied radio frequency signal from generator 24. Lens 62, which is also known as a Fourier lens, focusses each of deflected beam 76 to a point along the image plane 78 corresponding to its angular deflection. A plurality of output fibers 80 are arranged in a linear array so as to receive the substantially focussed rays 82 from lens 62. Thus, the value of the radio frequency signal applied to cell 18 will determine the angular deflection of the beam 76 and lens 62 will cause the deflected beam to be incident upon a preselected one of the fibers 80.

Scan lenses of the type described are well known in the art and are commercially available. A suitable lens is manufactured by D.O. Industries of East Rochester, N.Y. as their Part No. 1-4921. This lens has an effective focal length of 71.3 mm at a wavelength of 810 nm and a scan angle of ±13.8° with a linearity of 1.0%. A clear entrance aperture of 36 mm provides a 5°-6° working angle. While only a single lens element is shown in the figures for simplicity of illustration, it will be clear to one skilled in the art that a plurality of lens elements are required to provide the focal plane distribution shown in FIG. 3.

Figure 4:
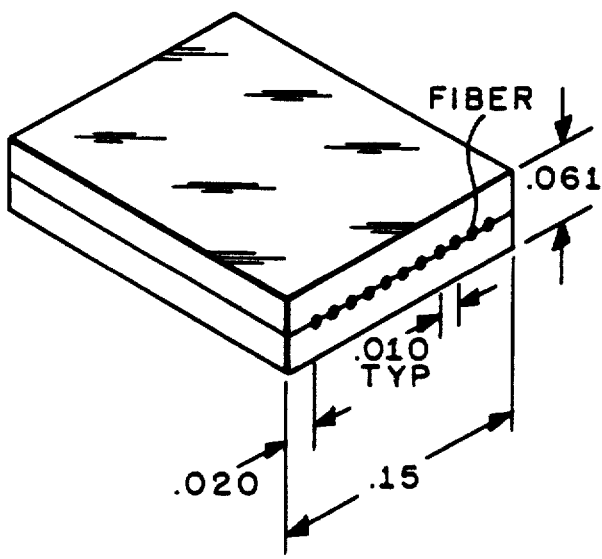
FIG. 4 shows the structure of a fixture for maintaining individual fiber optic lines in a predetermined spacing.
Figure 5:
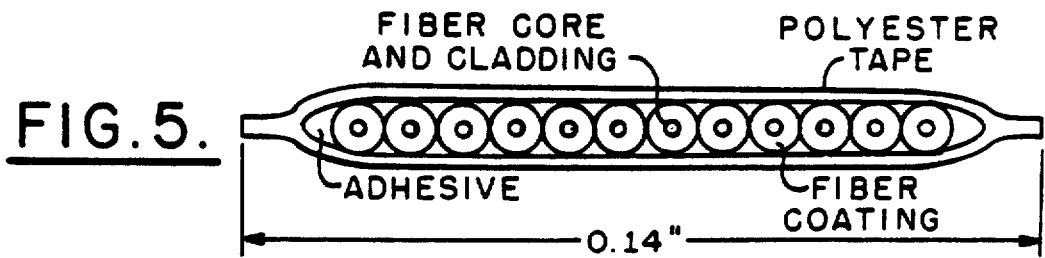
FIG. 5 shows the structure of a ribbon cable of the preferred embodiment.

In a further embodiment, the output fiber system 80 is comprised of a multimode ribbon fiber, such as is available from Western Electric Division of AT&T in their Bulletin 200-518. As shown in FIG. 5, twelve parallel fibers are sandwiched between two adhesive-faced polyester tapes to make a flat ribbon. The ribbon array is housed in a plastic tube. This construction facilitates handling of light guide cables. In a further embodiment, the ribbon is terminated in a planar structure having a plurality of V grooves to space the fiber cores accurately. Typically, the cores are 63 microns in diameter and are spaced linearly at 250 microns on center. A suitable structure is shown in FIG. 4. The structure shown provides for the use of a cable having twelve fibers, only eight of which are used herein for data channels. The remaining four fibers may be used to provide information for compensating for thermal changes.

An 8×8 acousto-optics switch prototype was constructed to measure various operational parameters. The fiber-to-fiber insertion loss was measured to be -6.3 dB. The switching time between channels was measured to be less than two microseconds. The cross-talk between adjacent channels was measured to be −34 dB. An array of eight independent Bragg cells, each with independent drive electronics, was used to deflect the input beams selectively towards the ribbon array of output fibers, aided by the lens system.

Figure 6:
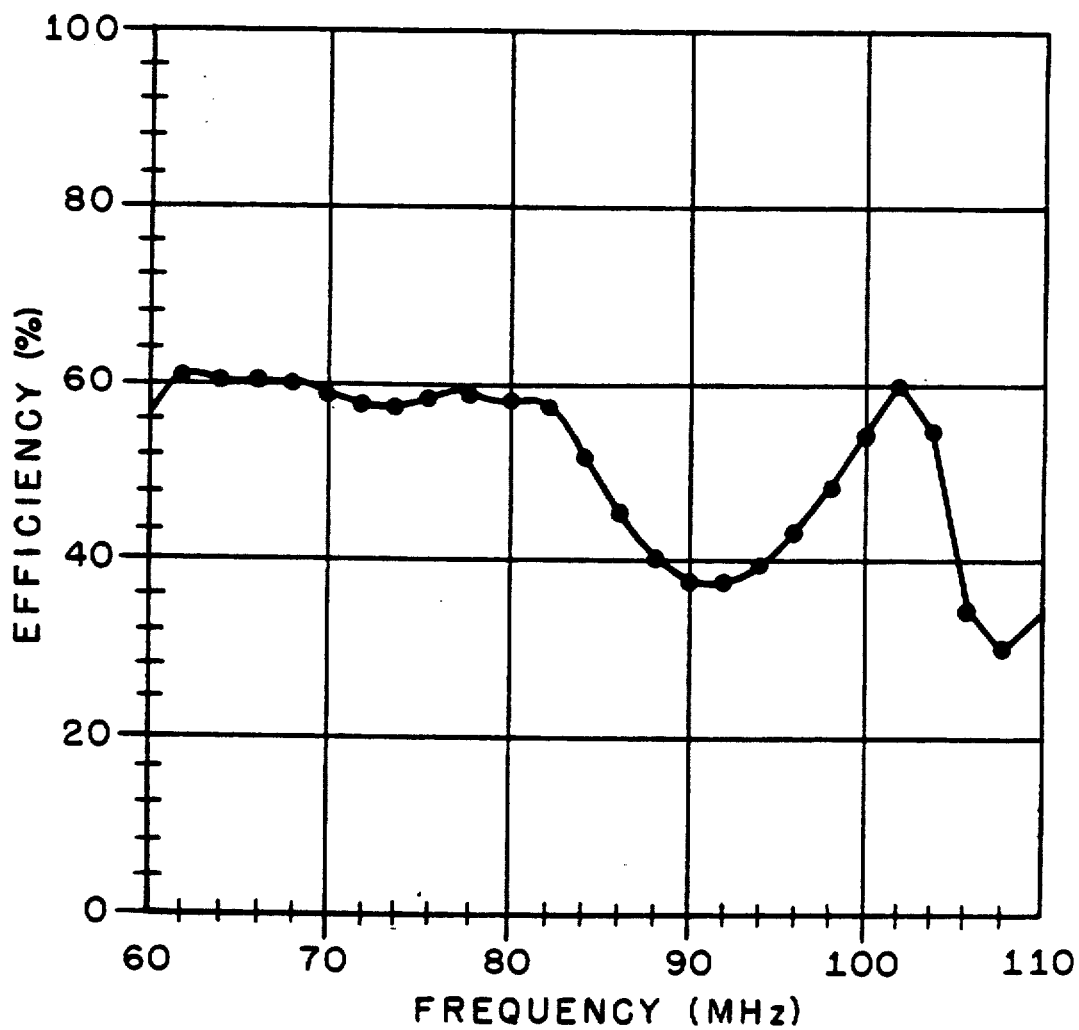
FIG. 6 is a graph showing relative optical efficiency over a given frequency range of operation of the RF frequency control circuit.

FIG. 6 is a plot of the deflection efficiency of an aperture of the Bragg cells as a function of applied frequency. The input beam angle incident to the cell is selected so as to provide a substantially flat deflection efficiency in the frequency region of 60-85 MHz. Higher deflection efficiencies up to 85% can be achieved with the same cell provided the frequency range is restricted. In the present invention, a frequency range of 60 MHz-85 MHz and an incident angle of approximately 3° provided a flat response and relatively high efficiency over the required range. The frequency range yields a deflection of 8 mm. Since an 8×8 switch with the fiber spacing described herein requires only a deflection of only about 4 mm, in practice only half the available frequency range is required to achieve the desired switching angle. While a single mode input system was chosen to provide the largest bandwidth, a multimode system can be achieved using the same approach.

While the invention has been described in its preferred embodiments, it is to be undrstood that the words which have been used are words of description rather than limitation and that changes may be made within the purview of the appended claims without departing from the true scope and spirit of the invention in its broader aspects.

What is claimed is:

1. An acousto-optic switch for selectively coupling an optical signal from one of a plurality of input terminals to one of a plurality of output terminals, comprising:

means coupled to said input terminals for collimating incident optical signals to provide collimated optical signals, means for producing an RF control signal at a selectable one of a plurality of preselected frequencies, a plurality of acousto-optic elements comprised of telurium dioxide crystals arranged in a linear array and positioned to intercept said collimated optical signals for selectively deflecting said collimated optical signals in a plane normal to said array at angles dependent upon the frequency of said RF control signal, the angle of deflection of an optical signal through each element of said array being individually and independently controllable by applying said RF signal to each of said acousto-optic elements and by varying said frequency to a predetermined one of said preselected frequencies, a scan lens positioned to intercept said deflected optical signals for focussing to focal points in a focal plane that is orthogonal to a plane defined by an optical axis of said lens and a plane of said linear array, and means for positioning said plurality of output terminals to be coincident with said focal points, whereat any of said optical signals may be coupled to any of said output terminals, wherein said means for collimating comprises beam forming optics in the path of said light beams for expanding each of said beams, and wherein said plurality of acousto-optic elements is comprised of Bragg cell elements.

2. The acousto-optic switch as set forth in claim 1, wherein said lens comprises a scan lens.

3. The acousto-optic switch as set forth in claim 2, wherein said means for providing an RF control signal comprises a frequency synthesizer.

4. The acousto-optic switch as set forth in claim 2, wherein said means for producing an RF signal comprises a computer for selectively providing a given one of a plurality of predetermined output signals, each of whose amplitudes corresponds to a predetermined angle of deflection, and a voltage controlled oscillator responsive to said output signals for providing a radio frequency output corresponding to the amplitude thereof.

5. The acousto-optic switch as set forth in claim 2, wherein said output terminals comprise a fiber-optic ribbon cable comprised of a plurality of spaced fiber-optic conductors having a first end disposed in a rigid core having a plurality of V grooves spaced to maintain said conductor spacing in a predetermined linear relationship.

6. The acousto-optic switch as set forth in claim 5, wherein said acousto-optic angle is 3°.

7. The acousto-optic switch as set forth in claim 6, wherein said deflected optical signals are linearly disposed in accordance with said conductor spacing.

8. An acousto-optic switch for selectively coupling an optical signal from one of a plurality of input terminals to one of a plurality of output terminals, comprising:

means coupled to said input terminals for producing a plurality of corresponding collimated light beams configured in a linear array and having a predetermined spacing within said array, computer controlled frequency synthesizer means for producing an RF control signal at a selectable one of a plurality of preselected frequencies, a plurality of Bragg cells comprised of telurium dioxide crystals arranged in a linear array and positioned in the path of said plurality of light beams so that each of a given one of said light beams is incident upon a given one of said Bragg cells at an acousto-optical angle, for producing acoustic waves in accordance with said RF control signal and providing a deflection of at least one of said collimated light beams in passing through one of said plurality of Bragg cells at an angle dependent upon the frequency of said RF control signal, and in a plane normal to said array, the angle of deflection of each element of said array being individually and independently controllable by applying said RF signal to each of said Bragg cells and by varying said frequency to a predetermined one of said preselected frequencies, a scan lens means positioned to intercept said deflected light beam for focussing said beam from a first focal plane at said linear array to a focal point in a second plane parallel to said first plane and orthogonal to said optical axis of said lens, so that said plurality of light beams are deflected along a linear axis in said second plane in accordance with corresponding ones of said preselected frequencies, and means positioning said plurality of output terminals in a further linear array coincident with said linear axis so that at least one of said deflected light beams is incident upon a selected one of said plurality of output terminals in accordance with one of said preselected frequencies of said RF control signal, wherein said output terminals comprise a fiber-optic ribbon cable comprised of a plurality of spaced fiber-optic conductors having a first end disposed in a rigid core having a plurality of V grooves spaced to maintain said conductor spacing in a predetermined linear relationship.

* * * * *